Aug. 23, 1927.

J. J. RATHERS 1,640,216

WRINGER ROLL AND METHOD OF MAKING THE SAME

Filed June 1, 1926

John J. Rathers
INVENTOR.

BY
ATTORNEYS.

Patented Aug. 23, 1927.

1,640,216

UNITED STATES PATENT OFFICE.

JOHN J. RATHERS, OF ERIE, PENNSYLVANIA, ASSIGNOR TO LOVELL MANUFACTURING COMPANY, OF ERIE, PENNSYLVANIA, A CORPORATION OF PENNSYLVANIA.

WRINGER ROLL AND METHOD OF MAKING THE SAME.

Application filed June 1, 1926. Serial No. 112,891.

This invention is designed to improve rubber rolls, such as wringer rolls. Such rolls are ordinarily provided with a supporting rod, a comparatively soft rubber roll bonded to the rod and some sort of an abutment, or support at the end of the rubber roll. In a patent issued to me, Jan. 12th, 1926, #1,569,393 I have provided a reenforced abutment at the end of the rubber roll which was formed by partially vulcanizing a washer or abutment formed of rubber and completing the vulcanization with the soft rubber roll. Where the ordinary rubber composition is used for the abutment the flow of the rubber in vulcanizing so distorts its shape as to make the method which is described in my prior patent desirable.

I have found that the abutment may be formed of an initially non-flowing stock and preferably this is formed by a mixture of live vulcanizing rubber and ground vulcanized rubber, the vulcanized rubber extending throughout the mass and being of non-flowing material maintains the initial shape of the abutment so that it may be vulcanized with the comparatively soft rubber of the roll and in the same vulcanizing operation as the roll and when so vulcanized gives a clean outline of abutment. Thus the initial vulcanizing step necessary with the method described in my former patent is avoided.

The apparatus for practicing the method and the roll forming the subject matter of the invention is illustrated in the accompanying drawings as follows:—

Figure 1:
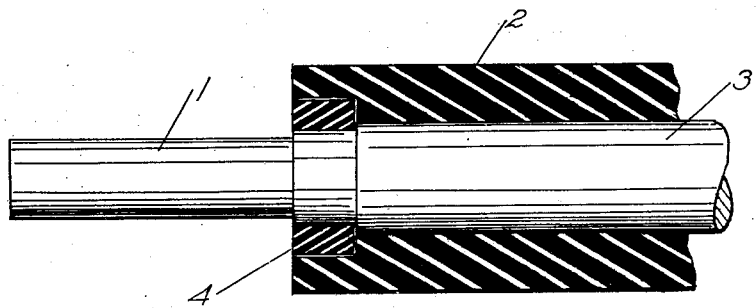

Fig. 1 is a sectional view of an end of a roll.

Figure 2:
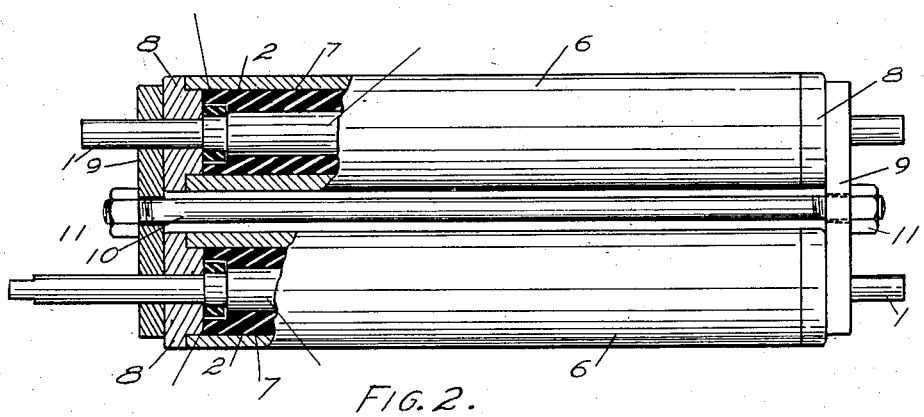

Fig. 2 a mold partially in section showing the manner of vulcanizing the roll.

1 marks the rod on which the roll is mounted, 2 the soft rubber roll bonded at 3 to the rod, and 4 an abutment which is arranged at the end of the roll secured to the rod and to the rubber of the roll through vulcanization.

The abutment is formed of an ordinary rubber compound that will form hard rubber in the vulcanizing period of the comparatively soft roll and contains a substantial proportion, preferably about twelve per cent of ground vulcanized rubber. The abutment is formed in its final shape and put in place and retains this shape approximately during the molding and vulcanizing operation and thus obviates the necessity for the preliminary vulcanizing operation as set forth in my prior patent.

The roll is ordinarily vulcanized in the molds 6 having the interior molding surface 7, and caps, or heads 8, the caps being perforated to receive the rod 1. The caps extend slightly into the molds and are put under pressure by the cross heads 9. A rod 10 extends from one cross head to the other and is provided with the nuts 11 by means of which the cross heads may be drawn up on the heads 8, the molds being arranged in pairs as shown. After the pressure has been delivered to the rubber through the action of the screws the rubber compound is vulcanized, the abutment forming a comparatively hard rubber and the roll 2 formed of comparatively soft rubber.

What I claim as new is:—

1. In a wringer roll, the combination of a rod; a soft rubber roll bonded to the roll; and a comparatively hard-composition abutment at the end of the roll secured to the rod and to the rubber roll, said abutment being formed initially of non-flowing stock formed of a ground vulcanized rubber and vulcanizing stock.

2. In a wringer roll, the combination of a rod; a soft rubber roll bonded to the rod; and a comparatively hard-composition abutment at the end of the roll secured to the rod and to the rubber roll, said abutment being formed initially of non-flowing vulcanizing stock formed of a ground vulcanized rubber and vulcanizing stock vulcanizable with the rubber of the roll.

3. The method of forming wringer rolls which consists in forming a vulcanizing rubber composition in bonding relation to a supporting rod to form a roll, applying to the ends of this roll an abutment of non-flowing vulcanizable stock, and vulcanizing the whole in one vulcanizing heat.

In testimony whereof I have hereunto set my hand.

JOHN J. RATHERS.